United States Patent
Minnich et al.

(10) Patent No.: US 9,637,404 B2
(45) Date of Patent: May 2, 2017

(54) METHOD FOR TREATING ORGANIC LADEN PRODUCED WATER

(71) Applicant: BACK PORCH HOLDINGS INC., Calgary (CA)

(72) Inventors: Keith R. Minnich, Calgary (CA); Jana L. Vander Kloet, Airdrie (CA)

(73) Assignee: Back Porch Holdings Inc., Calgary (CA)

( * ) Notice: Subject to any disclaimer, the term of this patent is extended or adjusted under 35 U.S.C. 154(b) by 71 days.

(21) Appl. No.: 14/711,395

(22) Filed: May 13, 2015

(65) Prior Publication Data

US 2015/0329398 A1 Nov. 19, 2015

Related U.S. Application Data

(60) Provisional application No. 61/992,691, filed on May 13, 2014.

(51) Int. Cl.
| | |
|---|---|
| *C02F 9/00* | (2006.01) |
| *C02F 11/12* | (2006.01) |
| *C02F 1/52* | (2006.01) |
| *C02F 1/66* | (2006.01) |
| *C02F 1/44* | (2006.01) |
| *C02F 101/30* | (2006.01) |
| *C02F 101/10* | (2006.01) |
| *C02F 1/04* | (2006.01) |
| *C02F 1/40* | (2006.01) |

(Continued)

(52) U.S. Cl.
CPC .......... *C02F 11/121* (2013.01); *C02F 1/5236* (2013.01); *C02F 1/5281* (2013.01); *C02F 1/66* (2013.01); *C02F 9/00* (2013.01); *C02F 1/04* (2013.01); *C02F 1/40* (2013.01); *C02F 1/42* (2013.01); *C02F 1/445* (2013.01); *C02F 1/60* (2013.01); *C02F 5/06* (2013.01); *C02F 11/122* (2013.01); *C02F 11/127* (2013.01); *C02F 2001/5218* (2013.01); *C02F 2101/10* (2013.01); *C02F 2101/30* (2013.01); *C02F 2103/10* (2013.01)

(58) Field of Classification Search
USPC ....................................... 210/710
See application file for complete search history.

(56) References Cited

U.S. PATENT DOCUMENTS

| | | | | |
|---|---|---|---|---|
| 4,146,471 A | * | 3/1979 | Wyness | C02F 1/5281 210/207 |
| 4,849,128 A | * | 7/1989 | Timmons | C02F 1/52 210/702 |

(Continued)

FOREIGN PATENT DOCUMENTS

CA 2862138 * 7/2013

*Primary Examiner* — Chester Barry
(74) *Attorney, Agent, or Firm* — Nixon & Vanderhye PC

(57) ABSTRACT

An oil recovery process which utilizes chemical precipitation and complexation reactions to remove dissolved organics and silica from waste water streams. The process produces brine suitable for deep well injection and solids suitable for Class II landfill. The treatment process can be used in combination with a concentrator and in addition to producing brine suitable for deep well injection and solids suitable for Class II landfill, the concentrator also produces a clean water stream for reuse. By including a crystallizer for the brine processing the system has zero liquid discharge.

20 Claims, 6 Drawing Sheets

(51) Int. Cl.
*C02F 1/42* (2006.01)
*C02F 1/60* (2006.01)
*C02F 5/06* (2006.01)
*C02F 103/10* (2006.01)

(56) References Cited

U.S. PATENT DOCUMENTS

| | | | | |
|---|---|---|---|---|
| 5,651,895 A * | 7/1997 | Gordon | ............ | C02F 1/5236 210/709 |
| 2004/0121473 A1* | 6/2004 | He | ............ | G01N 33/42 436/61 |
| 2007/0095759 A1* | 5/2007 | Bridle | ............ | C02F 1/42 210/687 |
| 2009/0255673 A1* | 10/2009 | Minnich | ............ | B01D 9/0036 166/266 |
| 2010/0029531 A1* | 2/2010 | Marhold | ............ | C11D 7/5059 510/175 |
| 2010/0038081 A1* | 2/2010 | Gamache | ............ | C02F 1/5245 166/267 |

* cited by examiner

METHOD FOR TREATING ORGANIC LADEN PRODUCED WATER

RELATED APPLICATIONS

This application claims the benefit of U.S. Patent Application No. 61/992,691 filed on May 13, 2014, which is hereby incorporated by reference in its entirety.

FIELD OF THE INVENTION

The present invention relates to an oil recovery process, and more particularly to treating produced water derived from an oil recovery process.

BACKGROUND

Conventional oil and gas recovery involves drilling a well and then pumping a mixture of oil and water from the well. Oil is separated from the water, and the produced water is usually re-injected into a sub-surface formation. Conventional oil recovery works well for low viscosity oil. However, conventional oil recovery processes do not work well for higher viscosity oil, also referred to as heavy oil. Conventional oil recovery processes also do not work well for oil or gas trapped in low permeability rock formations.

There are several methods used for enhanced recovery of oil ("EOR") and gas ("EGR"). Several of them involve injecting water, either in the form of steam or as a liquid, and in some cases with additives, to promote recovery of oil and gas. All of the water based methods generate produced water, which flows to the surface along with the hydrocarbons. Treating produced water, or treating the by-products of produced water treatment, to allow reuse or deep well disposal of the water poses a challenge when the water contains dissolved colloidal organics or sparingly soluble inorganic constituents.

The injection of steam into heavy oil bearing formations is a widely practiced EOR method. Typically, several tonnes of steam are required for each tonne of oil recovered. Steam heats the oil in the reservoir, which reduces the viscosity of the oil and allows the oil to flow to a collection well. The steam condenses and mixes with the oil and with any naturally occurring water in the formation. The mixture of condensed steam and naturally occurring water becomes produced water. The mixture of oil and produced water that flows to the collection well is pumped to the surface. Oil is separated from the produced water by conventional processes employed in conventional oil recovery operations.

For economic and environmental reasons it is desirable to recycle the produced water used in steam injection EOR. This is accomplished by treating the produced water, producing a feedwater, and directing the treated feedwater to a steam generator or boiler. The complete water cycle includes the steps of:
   a. injecting the steam into an oil bearing formation,
   b. condensing the steam to heat the oil whereupon the condensed steam mixes with the oil to become produced water,
   c. collecting the oil and produced water in a well,
   d. pumping the mixture of oil and produced water to the surface,
   e. separating the oil from the produced water,
   f. treating the produced water so that it becomes the steam generator or boiler feedwater, and
   g. converting 70% to 95% of the feedwater into steam for injecting into the oil bearing formation.

Treating the produced water to form a relatively pure boiler feed water for steam generation is challenging and generates waste streams containing dissolved organics and other sparingly soluble constituents which are difficult to further reuse or to dispose of in a deep well.

It is known that chemically treating water to precipitate the silica reduces the silica concentration to a level that is suitable for a Once Through Steam Generator ("OTSG"). This process is generally referred to as Warm Lime Softening followed by Ion Exchange (WLS/IX). The silica precipitates in a calcium carbonate/magnesium hydroxide sludge that is created by addition of lime, soda ash, and magnesium hydroxide. However, the WLS/IX process removes only a small portion of the organics and virtually none of the dissolved salts. Proper performance of the OTSG requires a blowdown stream of 10% to 30% of the feed water to prevent fouling or scaling of the heat transfer surface from the organics and salts. This blowdown stream is often further concentrated in an evaporator to recover water. The blowdown stream from the evaporator has a pH greater than 11, and contains 5,000 to 20,000 ppm of Total Organic Carbon (TOC) and more than 200 ppm of silica. The blowdown stream, if injected directly into a deep well, has the potential to plug the formation due to downhole precipitation of silica.

It is also known to chemically treat the produced water and subject the produced water to an evaporation process to form distillate for steam generation feedwater. In particular, it is known to use an evaporator and mechanical vapor compressor to produce the distillate. The pH of the feed to the evaporator is raised to maintain the solubility of silica. This prevents silica based scales from fouling the evaporator heat transfer surface. However, there are drawbacks and disadvantages to the current processes. The mechanical vapor compression evaporator recovers approximately 95% of the water from the de-oiled produced water. The remaining 5% of the produced water stream is difficult to process. The pH of the resultant stream is usually higher than 12, which makes the stream hazardous. Any attempt to neutralize the stream causes the precipitation of silica solids and organic compounds which are very difficult to separate from the aqueous solution. The neutralization process is also known to release hazardous gases, like hydrogen sulfide.

It is known that oil recovery gradually declines from conventional oil reservoirs using primary production and as little as 10% to 15% of the oil in place will be recovered. Secondary recovery using water flooding can improve oil recovery and allow recovery of an additional 10% to 15% of the oil in place. The injection of water with additives further improves recovery is also a widely practiced EOR. The additives may be alkaline surfactant polymer (ASP) for low pressure applications in conventional reservoirs. The produced water from primary and secondary recovery can be treated using conventional oil water separation techniques and then reused or disposed. The produced water from tertiary recovery using ASP is challenging to treat and reuse due to the presence of residual ASP polymer and ASP polymer degradation products. Various technologies have been tried, including conventional chemical precipitation, electrocoagulation, and membrane separation. These technologies have been only partially successful and generate wastes which are difficult to dewater and dispose or that do not sufficiently remove contaminants to meet the requirements for deep well disposal.

It is also known that injecting water with additives, known as hydraulic fracturing fluid, and sand into certain shale formations at sufficient pressure to fracture the rock releases trapped oil and/or gas. The additives may be gel type polymers intended to suspend sand particles in hydraulic fracturing operations. The volume of hydraulic fracturing fluid used in each well varies from several thousand cubic meters to several hundred thousand cubic meters. The sand is forced into the cracks of the shale formation to prop them open. After the pressure is reduced a portion of the injected water with additives flows from the well and then the previously trapped oil and/or gas flows into the well. The volume of flowback water varies from 5% to 75% of the initially injected volume of the hydraulic fracturing fluid. The flowback water can be reused or must be disposed. It is known that water with gel type polymer is more efficient at holding sand in suspension and delivering the sand into the cracks. However, flowback water with gel type polymer is difficult to treat for reuse or disposal. As with produced water from ASP floods, various technologies have been tried and have been only partially successful and generate wastes which are difficult to dewater and dispose.

SUMMARY OF THE INVENTION

The present invention relates to a wastewater treatment process used, for example, for high pH produced water generated in an oil or gas recovery process, which utilizes chemical precipitation and complexation reactions to remove dissolved organics from waste water streams. In one embodiment, the process includes the precipitation of dissolved organics and silica and the subsequent formation of a suspended solid complex. An acid is added to the waste water stream to remove up to 95% of the silica and up to 75% of the organics (measured as Total Organic Carbon "TOC"). The resultant solids are further complexed by the addition of an alkaline earth oxide. Following chemical addition, the treated waste water is agitated in a reactor vessel under controlled conditions to ensure thorough complexation of the additives, silica and TOC. The chemical demand, in the form of the acid and alkaline earth oxide combination, is directly related to the concentration of TOC, not silica, in the treated waste stream. The resulting solids floc mixture is easily separable using conventional dewatering equipment. The separated solids meet the requirements for Class II landfill and the brine is suitable for deep well injection.

In an alternative embodiment of the invention, the separated brine from the treatment process is directed to a concentrator or crystallizer located downstream of the dewatering device. In these processes, the concentrator or crystallizer further reduces the brine in the waste stream for disposal and creates a clean water stream suitable for reuse. When a crystallizer is used, the process results in zero liquid discharge.

A method of treating a waste water stream containing an organic material is provided, including: adding an acid to the water stream to produce a treated water stream; adding an alkaline earth oxide slurry to the treated water stream to produce a floc stream; and separating the solids from the floc stream. The waste water stream may have a pH >10 and comprise silica and an organic material. The silica in the waste water stream may be greater than 250 mg/L. The waste water stream may be agitated after the addition of the acid. The acid may be mixed with the waste water stream in a precipitator reactor. The acid may be hydrochloric acid (HCl) or carbon dioxide ($CO_2$). The acid may be a Lewis acid, such as $FeCl_3$.

The alkaline earth slurry is added to the treated water stream in a complexation reactor. The alkaline earth slurry may be agitated with the treated water stream in the complexation reactor at a temperature from 75° C. to 85° C. The complexation reactor may have a cone bottom. The complexation reactor may have a height to diameter ratio of between 1.0 and 1.7. The alkaline earth slurry may comprise MgO or CaO.

The solids may be separated from the floc stream by a dewatering device. The dewatering device produces brine, and the brine may be concentrated in a concentrator, which may be an evaporator or a forward osmosis membrane system. The brine may be concentrated in a crystallizer producing a salt slurry, which may be dewatered.

The waste water stream may be produced after an oil-water separation process.

A system for treating a waste water stream is provided, including: a precipitation reactor configured to mix an acid with the waste water stream to produce a treated water stream; a complexation reactor configured to receive the treated water stream and add a alkaline earth oxide slurry to produce a floc stream; and a dewatering device to separate solids in the floc stream.

A method of treating a waste water stream containing silica and organic matter, is provided, including: receiving an oil-water mixture; separating oil in the oil water mixture from water in the oil-water mixture to produce a produced water stream; purifying the produced water stream; generating steam from the produced water which produces a waste water stream containing organics; adding acid to the waste water stream to produce a treated water stream; adding an alkaline earth oxide slurry to the treated water stream to produce a floc stream; and separating the solids from the floc stream.

The other objects and advantages of the present invention will become apparent and obvious from a study of the following description and the accompanying drawings which are merely illustrative of such invention.

DETAILED DESCRIPTION OF THE INVENTION

Figure 1:
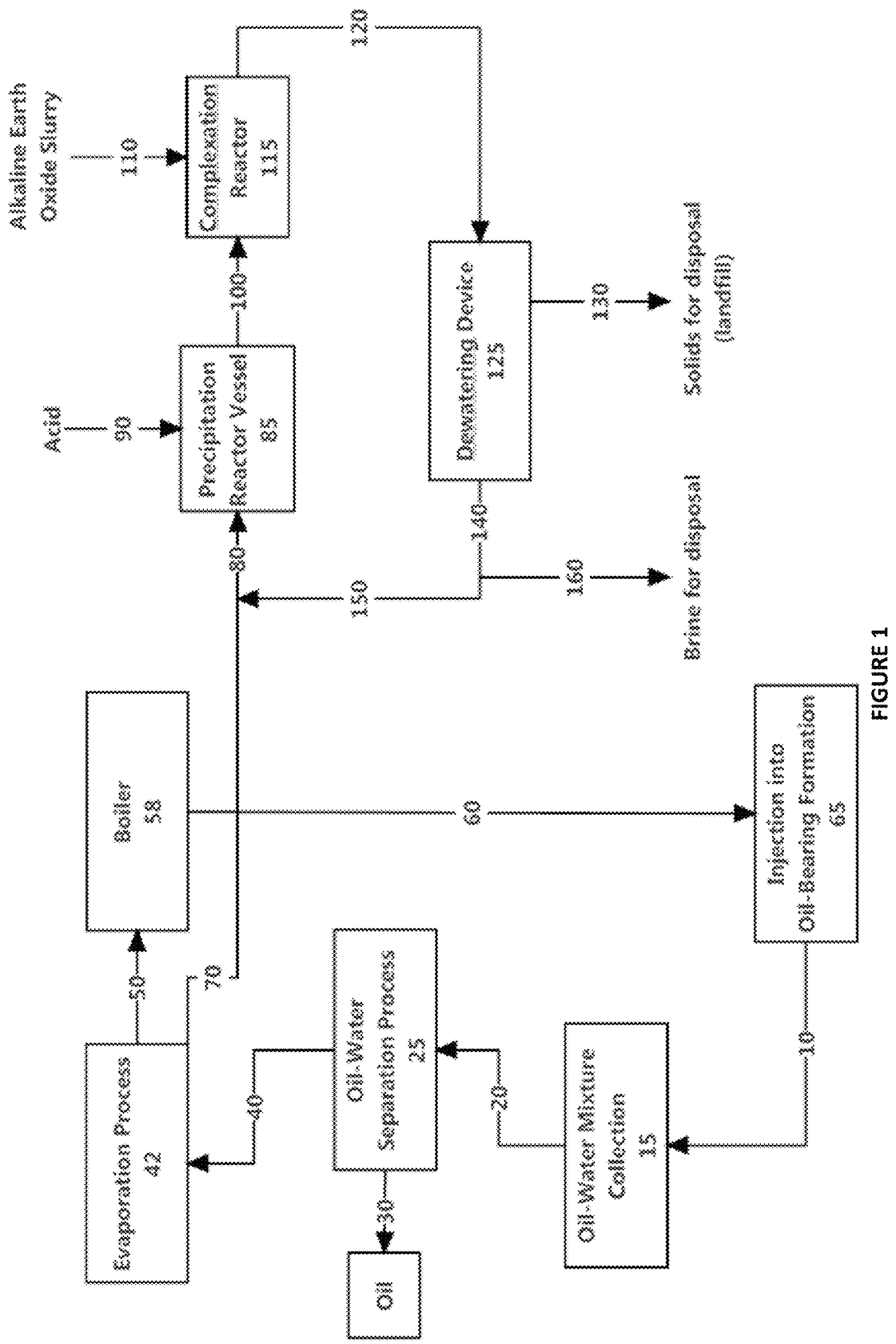
FIG. 1 is a schematic representation of an embodiment of the invention, showing an evaporation-based heavy oil recovery process with a backend precipitation, complexation and dewatering treatment process.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise. The term "plurality" means "two or more", unless expressly specified otherwise. The term "herein" means "in the present application, including anything which may be incorporated by reference", unless expressly specified otherwise.

The term "e.g." and like terms mean "for example", and thus does not limit the term or phrase it explains.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

Where two or more terms or phrases are synonymous (e.g., because of an explicit statement that the terms or phrases are synonymous), instances of one such term/phrase does not mean instances of another such term/phrase must have a different meaning For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. Section 1.72(b) or similar law in other jurisdictions. The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

Figure 2:
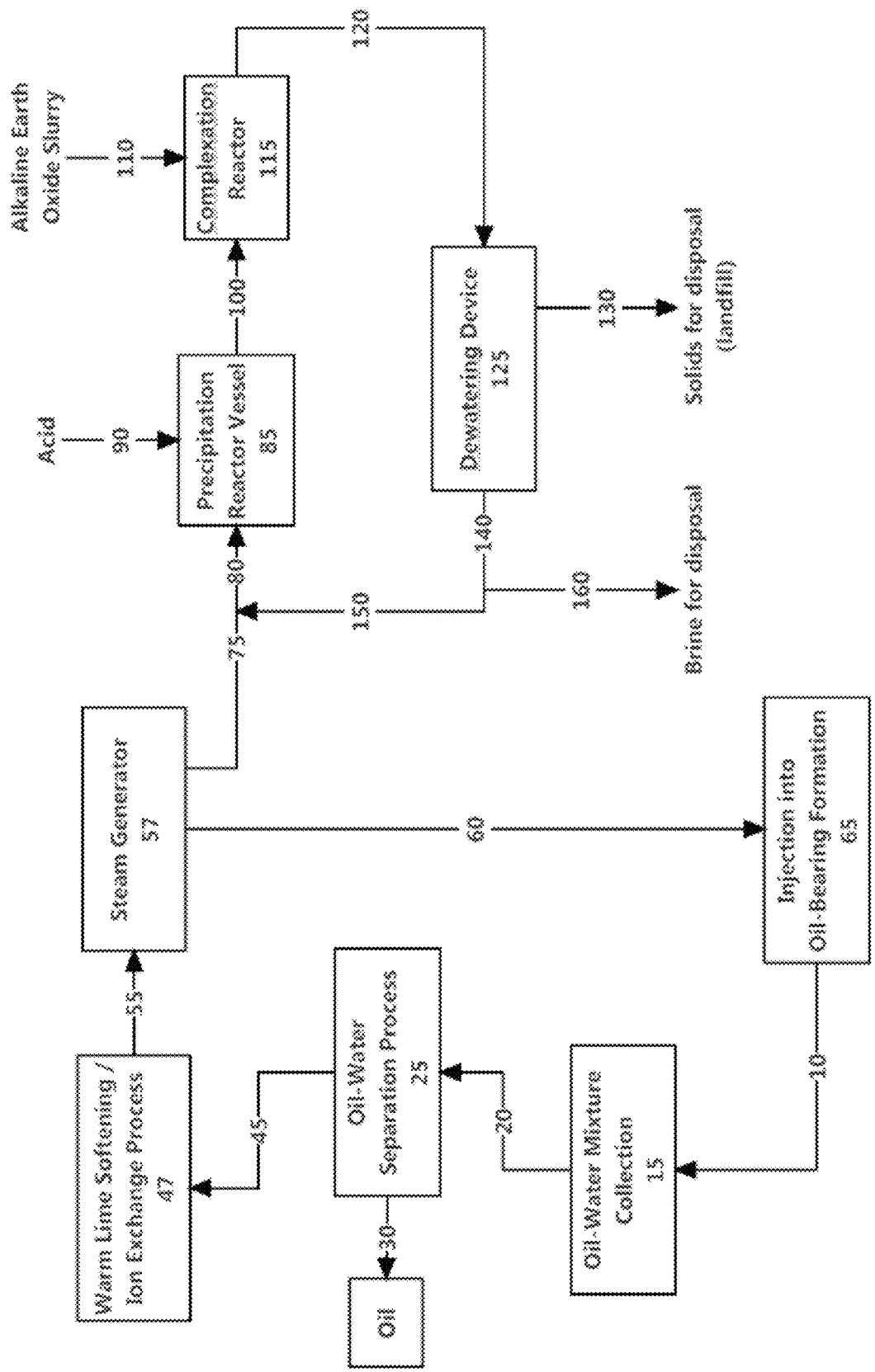
FIG. 2 is a schematic representation of an alternative embodiment of the invention, showing a warm lime softening-based heavy oil recovery process with a backend precipitation, complexation and dewatering treatment process.

Two embodiments of the general process of the present invention are illustrated schematically in FIGS. 1 and 2, respectively. Oil-water mixture 20 from an oil-water mixture collection 15 is directed to an oil-water separation process 25 which effectively separates the oil 30 from the water stream 40 (or 45 as shown in FIG. 2). This is commonly referred to as primary separation and can be carried out by various conventional processes such as gravity or centrifugal separation. Separated water may be subjected to a polishing de-oiling process where additional oil is removed from the water. Resulting water from the oil-water separation process is referred to as "produced water". Produced water contains residual suspended silica solids, emulsified oil, dissolved organic material and dissolved solids. Following separation, the produced water stream 40 (or 45 as shown in FIG. 2) is directed by a line to a downstream purification process, such as an evaporation process 42 as shown in FIG. 1, or alternatively, a warm-lime softening with ion exchange process 47 as shown in FIG. 2. The downstream purification process purifies the produced water and produces a purified water stream 50 (or purified water stream 55 as shown in FIG. 2). Purified water 50 is directed to a steam generator, such as a boiler 58, where steam is generated and injected 60 into the oil bearing formation 65 to eventually form the oil-water mixture that is pumped to the surface 10 and collected at oil-water mixture collection 15 to repeat the process. Alternatively, as shown in FIG. 2, after the warm lime softening/ion exchange process 47, purified water stream is directed to steam generator 57, where steam is generated and injected 60 into the oil bearing formation 65 to eventually form the oil-water mixture that is pumped to the surface 10 and collected at oil-water mixture collection 15 to repeat the process.

The evaporation purification process 42 also creates a waste stream 70. In the case of the warm-lime softening with ion exchange purification process 47, as shown in FIG. 2, waste stream 75 originates from the steam generator 57.

The waste streams, either waste stream 70 or waste stream 75, as shown in FIGS. 1 and 2 respectively, from either exchange purification process, such as warm lime softening/ion exchange process 47 or evaporation process 42 respectively, have a pH >10 and contain high levels of silica (250-20,000 mg/L); suspended and dissolved organics, measured as Total Organic Carbon (TOC) (5,000-20,000 mg/L); and dissolved inorganic solids (10,000-150,000 mg/L). The suspended organics may include significant concentrations of oil if operational upset conditions fail to separate the oil from the water.

Waste streams 70 and 75 are intended for use in deep well injection 65. However, the silica in these waste streams can precipitate in the disposal formation and reduce the capacity of the disposal well. Existing processes are directed towards removal of silica and generate a solid phase which is extremely difficult to separate from the aqueous phase and which scales and fouls equipment.

The present invention provides for the removal of silica and organics from waste streams 70 or 75 and converts the silica and organics therein to a solid form that is easily separated from the aqueous phase. The method according to the invention includes a process which is focused on organic removal rather than silica removal. Each step of the process, by itself, removes silica, but does not produce a solid phase which is easily separated from the aqueous phase. A two-step process first precipitates the silica and organics and then produces a complex which is easily separated from the aqueous phase.

In the present invention an acid, such as $FeCl_3$, is used to lower the pH of the waste stream and cause acid insoluble organics and silica to precipitate from the waste water (other acids that could be used include hydrochloric acid (HCl), carbon dioxide ($CO_2$), or aluminium chloride ($AlCl_3$)). The precipitated organics and ferric hydroxide form a floc. In the case of using HCl or $CO_2$ the floc is primarily precipitated acid insoluble organics. In this step, the majority (up to 95%) of the silica and the organics (up to 75%), are removed from the water. Using $FeCl_3$ as an example, the chemical reaction in this step is as follows:

Ferric chloride is a soluble acid that dissociates in aqueous solutions:

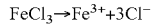

$$FeCl_3 \rightarrow Fe^{3+} + 3Cl^-$$

When the ferric ions ($Fe^{3+}$) encounter the high pH environment, insoluble ferric hydroxide ($Fe(OH)_3$) precipitates near instantaneously according to the reaction:

$$Fe^{3+} + 3OH^- \rightarrow Fe(OH)_3$$

The ferric hydroxide and precipitated organics form a floc, which adsorbs/absorbs silica. The removal mechanism for silica is adsorption of silica onto freshly precipitated organics and $Fe(OH)_3$. The removal of organics can be considered a destabilization of the colloidal material by the addition of a cationic charge and/or the precipitation of a complex formed by a partially hydrolyzed iron ion with an ionic functional group on the organic molecule. The organic constituents typically affected by this coagulant are colloidal or have a high molecular weight and high hydrophobicity (e.g. humic acids).

If alternative acids, which do not form metal hydroxide precipitates, are used the chemical reactions are similar and result in precipitated organic flocs.

$FeCl_3$ coagulant demand may depend on the nature of the dissolved organic material, as measured by the Specific UV Absorbance (SUVA) or TOC concentration of waste water 70 or 75, as appropriate.

The ferric hydroxide floc from this step has poor filterability characteristics. A filtration rate of less than 200 Liters/($m^2$-hr) (LMH) is typical. This is consistent with other studies which have shown that pH adjustment of high-silica, high organic concentration waters alone or adsorption of silica onto one hydroxide material, such as $Mg(OH)_2$, yield a material which does not easily separate from solution.

The method according to the invention addresses the filterability problem by hydrolyzing an alkaline earth, such as MgO or CaO, in the presence of the floc formed from addition of acid. As an example, when mixed with water, calcium oxide hydrolyzes to calcium hydroxide ($Ca(OH)_2$) according to the reaction:

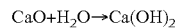

$$CaO + H_2O \rightarrow Ca(OH)_2$$

Calcium hydroxide will react with carbonate to form calcium carbonate according to the reaction:

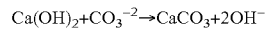

$$Ca(OH)_2 + CO_3^{-2} \rightarrow CaCO_3 + 2OH^-$$

These reactions are a function of both time and temperature.

In current Steam Assisted Gravity Drainage (SAGD) water treatment applications, the reaction is controlled such that the $Mg(OH)_2$ is formed over time and at elevated temperatures in the presence of dissolved silica. In such applications, the dissolved silica adheres to the $Mg(OH)_2$ crystals and is removed from the solution. The concentration of TOC in produced water from current SAGD applications is between 400 and 1,000 mg/L and the dosage of MgO is related to the concentration of silica. Typical magnesium dosages used in current silica removal treatment are in the range of ratios of 0.4 to 1.5 of the Mg ion to $SiO_2$.

In the method according to the invention, the acid removes the bulk of the silica and organics from waste water stream 70 or 75 and the alkaline earth, CaO for example, produces a calcium hydroxide-calcium carbonate-ferric hydroxide complex floc which can easily be dewatered. The addition of CaO is a function of the TOC concentration and not the silica concentration.

Figure 4:
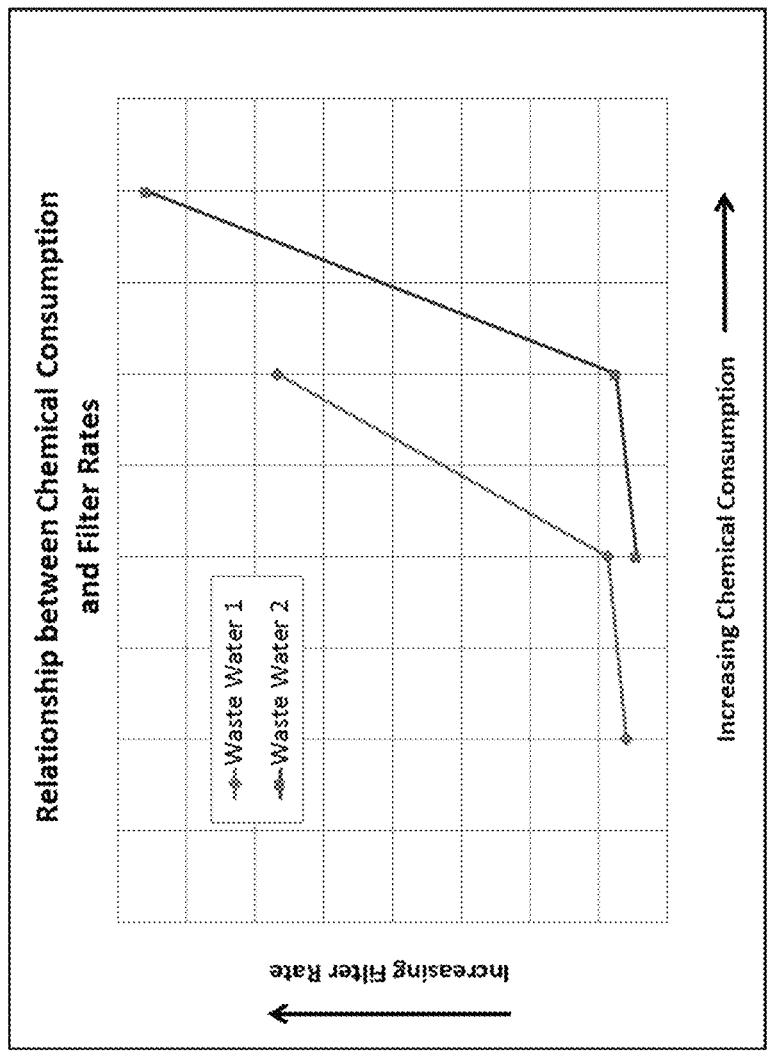
FIG. 4 is a graph showing the relationship between filterability and chemical addition in the process according to the invention.
Figure 5:
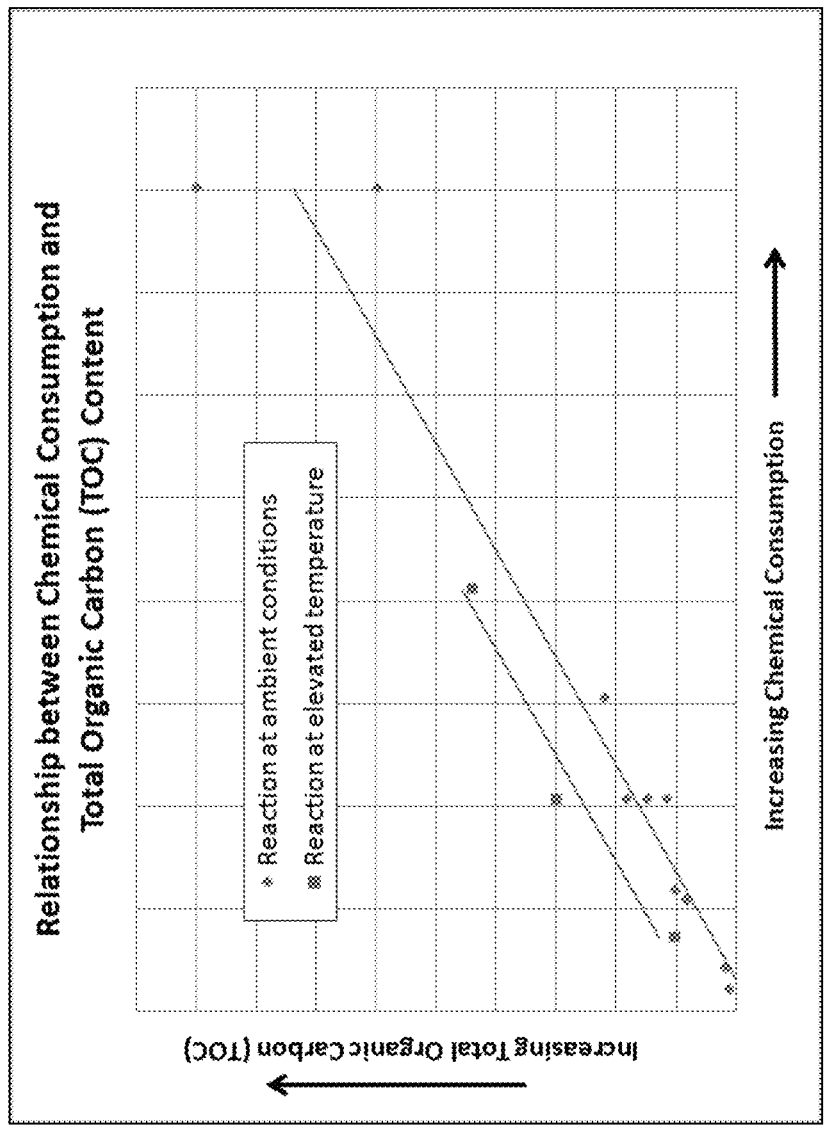
FIG. 5 is a graph showing the relationship between TOC and chemical addition in the process according to the invention.

The relationship between filterability and chemical addition is shown in FIG. 4. A filtration rate greater than 500 LMH with a differential pressure of 0.5 bar is generally commercially acceptable. The relationship between TOC and chemical addition to achieve commercially acceptable dewatering rates is linear and is shown in FIG. 5.

The solids floc may contain between 2% and 8% solids (w/v) and has excellent filterability characteristics (LMH ranging from 1500 to 8000). The solids can be effectively separated by filtration or centrifugation. In the case of filtration, a thick solids cake does not impede the filtration rate and readily releases from a filter paper or filter cloth. In the case of centrifugation, the centrate is free of suspended particulates and may be rapidly separated from the solids in less than a minute at moderate RCF (relative centrifugal force) rate.

Waste streams 70 or 75 with TOC concentrations below 6,000 to 8,000 mg/L may be treated 'as is' and at temperatures ranging from 75-85° C. Waste streams 70 or 75 with higher TOC concentrations are diluted as necessary with brine 150 from within the process to reduce the TOC to approximately 8,000 mg/L. The resultant waste water 80, diluted or neat, can be allowed to cool and be reheated later, either directly or indirectly, to between 75-85° C.

As shown in FIGS. 1 and 2, the waste water 80, diluted or undiluted, is submitted to the first of two chemical treatment steps. The first step is the addition of an acid 90, such as ferric chloride ($FeCl_3$), to achieve approximately 2,000 mg/L as $FeCl_3$ within the waste water 80. The $FeCl_3$ addition can added be directly to the waste water 80 in such a way that there is thorough and complete mixing in a turbulent environment or may be added to a Precipitation Reactor Vessel 85 where the $FeCl_3$-treated water is continuously agitated (~50-100 rpm) during the addition for about 10 seconds. In this step, the majority of organics and dissolved silica are precipitated from solution, as described above.

The acid treated, such as $FeCl_3$-treated, water stream 100 is then submitted to the second chemical treatment which involves the complexation of the precipitates formed in the previous step with an alkaline earth hydroxide. The second chemical addition is an alkaline earth oxide slurry 110, such as magnesium oxide (MgO) or calcium oxide (CaO), to the Complexation Reactor 115. The alkaline earth oxide, such as MgO or CaO, is added as a slurry. The slurry is prepared by mixing the MgO or CaO powder with either a clean water source or recycled brine at temperatures not exceeding 30° C. The slurry mixture may be 10% (w/v) and can be premade up to one hour before addition. The slurry may be added in one bulk addition. The treated water is continuously agitated (~50-100 rpm) during addition for about 30 seconds.

After the alkaline earth oxide addition, the treated water is agitated slowly (approximately 20 rpm) in the complexation reactor 115 at elevated temperatures (70-85° C.) for 30-120 minutes. The agitator suspends the solids and creates contact between the alkaline earth hydroxide and acid hydroxide floc solids and the wastewater. The complexation reactor vessel 115 may have a cone bottom, preferably with a slope between 8-15°. Vessel 115 may include baffles to ensure radial mixing. The reactor vessel 115 should have a height to diameter ratio of between 1.0 and 1.7. The ratio of agitator diameter to tank diameter may be between 0.3 and 0.5. This prevents solids from accumulating or settling in reactor vessel 115.

The solids floc stream 120 is transferred with a pump to a dewatering device 125 which may be a centrifuge, series of centrifuges, filter press or other commercially available device for solids separation. The dewatering device separates the solids 130 from the brine 140. The resulting separated solids meet landfill Class II requirements and are suitable for disposal by trucking A portion of the filtered brine 150 can be used to dilute the incoming waste streams 70 or 75 prior to treatment. A portion of the brine 160 can disposed by deep well injection or further concentrated as described below. The brine has the following qualities:
 a. Silica concentration less than 150 mg/L;
 b. Substantial removal of suspended solids greater than 10 micron in size; and
 c. Hardness less than 500 mg/L as $CaCO_3$.

Figure 3A:
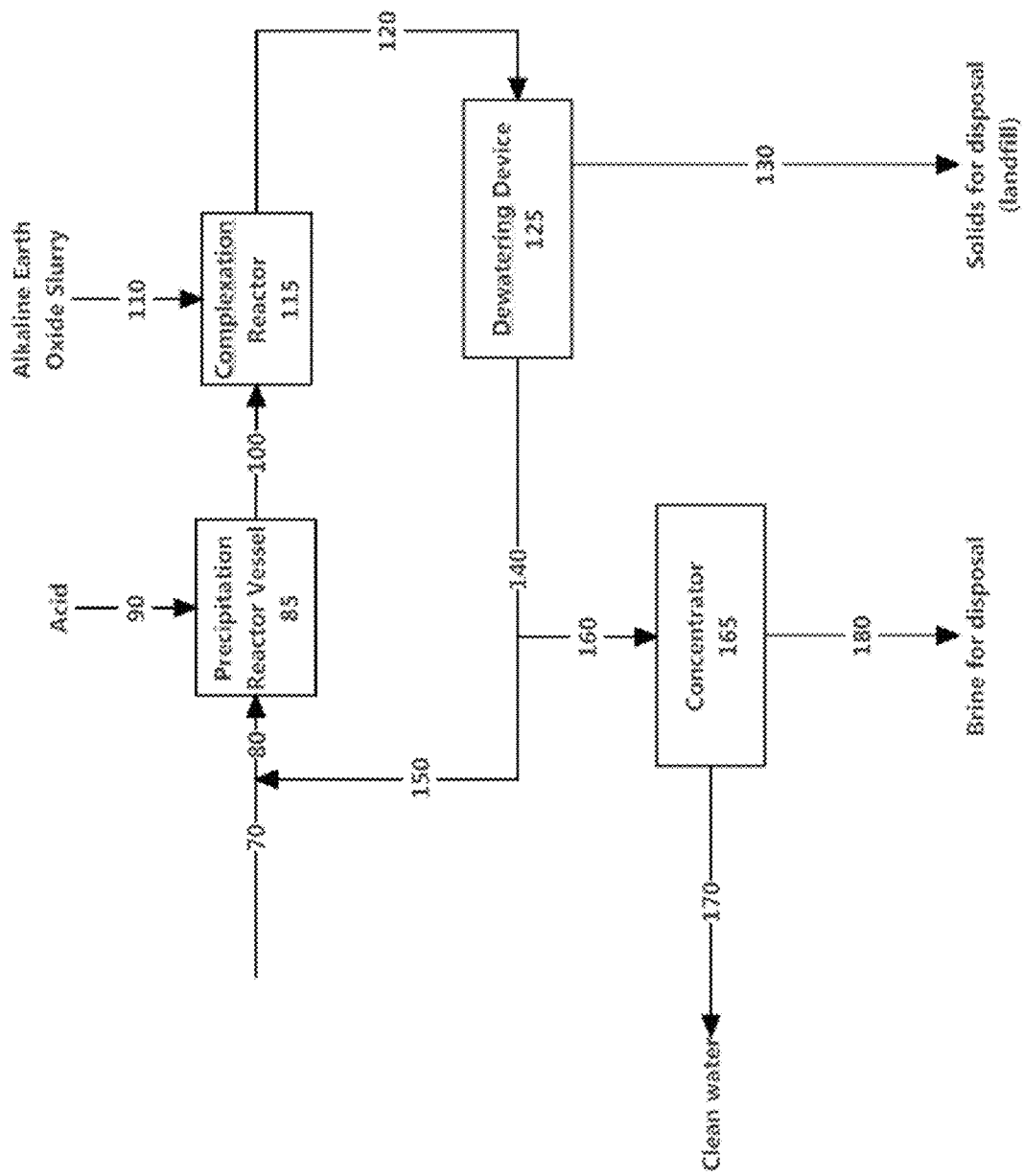
FIG. 3a is a schematic illustration of an embodiment of a backend precipitation, complexation and dewatering treatment process according to the invention, including a concentration step.

In another embodiment of the invention, as shown in FIG. 3a, the brine 160 from the dewatering device can be further concentrated at concentrator 165 to reduce the volume of disposed liquid. Concentrator technology is readily available and may be based on evaporation or membrane processes, such as forward osmosis, so that concentrator 165 may be an evaporator or a forward osmosis membrane system. Concentrators 165 produce brine 180, suitable for deep well injection, and a clean water stream 170 which is recyclable for beneficial reuse.

Figure 3B:
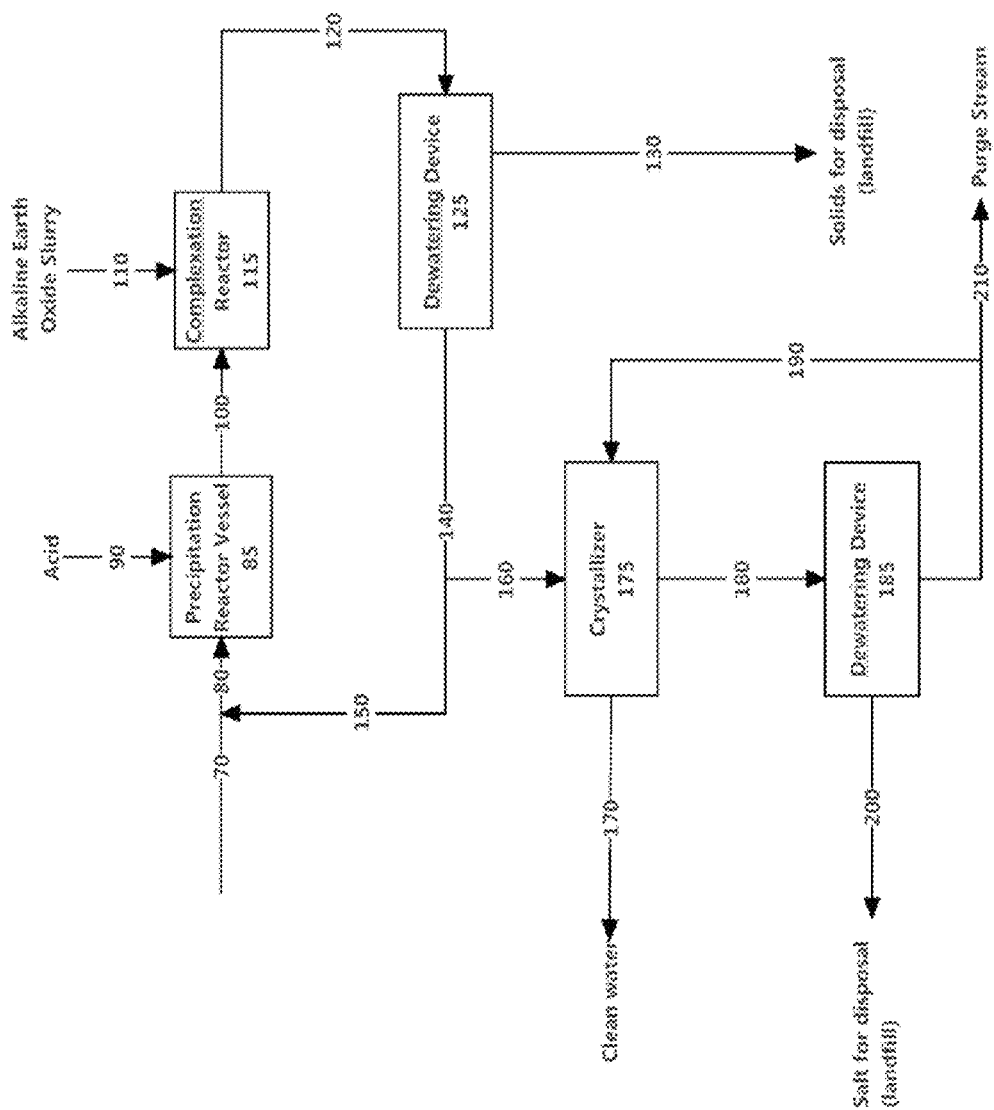
FIG. 3b is a schematic illustration of an alternative embodiment of the backend precipitation, complexation and dewatering treatment process according to the invention, including a crystallization step.

In another embodiment of the invention, as shown in FIG. 3b, the brine 160 from the dewatering device can be further concentrated in a crystallizer 175 to nearly eliminate the volume of disposed liquid. Crystallizer 175 produces a clean water phase 170, which can be recycled for beneficial reuse, and a salt slurry 180. The salt slurry 180 is dewatered in a second dewatering device 185, such as a centrifuge or filter press, producing a salt cake 200, which is suitable for a landfill, and a centrate/filtrate 190, which may be recycled to the crystallizer 175. A portion of the centrate/filtrate 190 can be purged as stream 210 to prevent the accumulation of organics.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various methods described above may omit some acts, include other acts, and/or execute acts in a different order than set out in the illustrated embodiments. As another example the acid used could be another Lewis acid, such as magnesium chloride.

Further, in the methods taught herein, the various acts may be performed in a different order than that illustrated and described. Additionally, the methods can omit some acts, and/or employ additional acts.

These and other changes can be made to the present systems, methods and articles in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

We claim:

1. A method of treating a waste water stream having a pH >10 and comprising silica greater than 250 mg/L and an organic material, comprising:
 adding an acid to the waste water stream to produce a treated water stream;
 adding an alkaline earth oxide slurry comprising an alkaline earth oxide and water or brine, to the treated water stream to produce a floc stream; and
 separating the solids from the floc stream.

2. The method of claim 1 wherein the waste water stream is agitated after the addition of the acid.

3. The method of claim 1 wherein the acid is mixed with the waste water stream in a precipitator reactor.

4. The method of claim 1 wherein the acid is $FeCl_3$.

5. The method of claim 1 wherein the alkaline earth oxide slurry is added to the treated water stream in a complexation reactor.

6. The method of claim 5 wherein the alkaline earth oxide slurry is agitated with the treated water stream in the complexation reactor at a temperature from 75° C. to 85° C.

7. The method of claim 5 wherein the complexation reactor has a cone bottom.

8. The method of claim 7 wherein the complexation reactor has a height to diameter ratio of between 1.0 and 1.7, the diameter being at an upper end of the cone.

9. The method of claim 1 wherein the solids are separated from the floc stream by a dewatering device.

10. The method of claim 9 wherein the dewatering device produces brine, and the brine is concentrated in a concentrator.

11. The method of claim 10 wherein the concentrator is an evaporator.

12. The method of claim 10 wherein the concentrator is a forward osmosis membrane system.

13. The method of claim 1 wherein the acid is a Lewis acid.

14. The method of claim 9 wherein the dewatering produces brine, and the brine is concentrated in a crystallizer producing a salt slurry.

15. The method of claim 14 wherein the salt slurry is dewatered.

16. The method of claim 1 wherein the alkaline earth oxide slurry comprises MgO.

17. The method of claim 1 wherein the alkaline earth oxide slurry comprises CaO.

18. The method of claim 1 wherein the waste water stream is produced after an oil-water separation process.

19. A system for treating a waste water stream having a pH >10 and comprising silica greater than 250 mg/L and an organic material, comprising:
   a precipitation reactor configured to mix an acid with the waste water stream to produce a treated water stream;
   a complexation reactor configured to receive the treated water stream and add an alkaline earth oxide slurry comprising an alkaline earth oxide and water or brine, to produce a floc stream; and
   a dewatering device to separate solids in the floc stream.

20. A method of treating a waste water stream having a pH >10 and comprising silica greater than 250 mg/L and organic matter, comprising:
   receiving an oil-water mixture;
   separating oil in the oil water mixture from water in the oil-water mixture to produce a produced water stream;
   purifying the produced water stream;
   generating steam from the produced water which produces a waste water stream containing organics;
   adding acid to the waste water stream to produce a treated water stream;
   adding an alkaline earth oxide slurry comprising an alkaline earth oxide and water or brine, to the treated water stream to produce a floc stream; and
   separating the solids from the floc stream.

* * * * *